United States Patent
Lipilin et al.

(10) Patent No.: US 8,101,310 B2
(45) Date of Patent: Jan. 24, 2012

(54) LIQUID ANODE ELECTROCHEMICAL CELL

(75) Inventors: Alexander S. Lipilin, Ekaterinburg (RU); Iouri I. Balachov, Menlo Park, CA (US); Lawrence H. Dubois, Palo Alto, CA (US); Angel Sanjurjo, San Jose, CA (US); Michael C. McKubre, Menlo Park, CA (US); Steven Crouch-Baker, Palo Alto, CA (US); Marc D. Hornbostel, Palo Alto, CA (US); Francis Louis Tanzella, San Carlos, CA (US)

(73) Assignee: SRI International, Menlo Park, CA (US)

( * ) Notice: Subject to any disclaimer, the term of this patent is extended or adjusted under 35 U.S.C. 154(b) by 1537 days.

(21) Appl. No.: 11/134,555

(22) Filed: May 19, 2005

(65) Prior Publication Data

US 2006/0019132 A1 Jan. 26, 2006

Related U.S. Application Data

(60) Provisional application No. 60/572,900, filed on May 19, 2004.

(51) Int. Cl.
*H01M 8/00* (2006.01)

(52) U.S. Cl. .................................. 429/430; 429/440
(58) Field of Classification Search .................. 429/430, 429/479, 495, 497
See application file for complete search history.

(56) References Cited

U.S. PATENT DOCUMENTS

| | | | |
|---|---|---|---|
| 2,830,109 A | 4/1958 | Braunschweig et al. | |
| 3,077,508 A | 2/1963 | Oswin | |
| 3,138,490 A | 6/1964 | Tragert et al. | |
| 3,503,808 A * | 3/1970 | Nagey et al. | 429/16 |
| 3,741,809 A | 6/1973 | Anbar | |
| 3,970,474 A | 7/1976 | Anbar et al. | |
| 4,170,534 A | 10/1979 | Fitterer | |
| 4,826,740 A | 5/1989 | Costa | |
| 5,134,042 A | 7/1992 | Madou et al. | |
| 5,298,340 A | 3/1994 | Cocks et al. | |

(Continued)

FOREIGN PATENT DOCUMENTS

WO    WO 01/80335    10/2001

OTHER PUBLICATIONS

Russian Office Action for Application No. 2006140778/09(044533), Oct. 14, 2008, 9 pages.
Cooper et al., "Direct Carbon Conversion: Review of production and electrochemical conversion of reactive carbons, economics and potential impact on the carbon cycle," USDE, Lawrence Livermore National Laboratory, pp. 3-21, 2000.

(Continued)

*Primary Examiner* — Jennifer Michener
*Assistant Examiner* — Monique Wills (57) ABSTRACT

An electrochemical cell is provided which has a liquid anode. Preferably the liquid anode comprises molten salt and a fuel, which preferably has a significant elemental carbon content. The supply of fuel is preferably continuously replenished in the anode. Where the fuel contains or pyrolyzes to elemental carbon, the reaction $C + 2O^{2-} \rightarrow CO_2 + 4e^-$ may occur at the anode. The electrochemical cell preferably has a solid electrolyte, which may be yttrium stabilized zirconia (YSZ). The electrolyte is connected to a solid or liquid cathode, which is given a supply of an oxidizer such as air. An ion such as $O^{2-}$ passes through the electrolyte. If $O^{2-}$ passes through the electrolyte from the anode to the cathode, a possible reaction at the cathode may be $O_2 + 4e^- \rightarrow 2O^{2-}$. The electrochemical cell of the invention is preferably operated as a fuel cell, consuming fuel and producing electrical current.

23 Claims, 6 Drawing Sheets

U.S. PATENT DOCUMENTS

| | | | |
|---|---|---|---|
| 5,348,812 A | | 9/1994 | Cocks et al. |
| 5,376,469 A | | 12/1994 | Gur et al. |
| 5,470,672 A | * | 11/1995 | Naoumidis .................. 429/478 |
| 6,200,697 B1 | | 3/2001 | Pesavento |
| 6,607,853 B1 | | 8/2003 | Hemmes |
| 6,692,861 B2 | | 2/2004 | Tao |
| 2002/0122967 A1 | | 9/2002 | Gorina et al. |
| 2003/0143440 A1 | | 7/2003 | Tao et al. |
| 2005/0089738 A1 | * | 4/2005 | Tao et al. .................. 429/27 |
| 2006/0286415 A1 | * | 12/2006 | Muller et al. .................. 429/13 |
| 2008/0182147 A1 | * | 7/2008 | Blake et al. .................. 429/33 |

OTHER PUBLICATIONS

Fuel Cell Handbook, $5^{th}$ Ed., USDE Office of Fossil Energy, National Energy Technology Laboratory, Morgantown, WV, Oct. 2000.

Yentekakis and Debenedetti, "A novel fused metal anode solid electrolyte fuel cell for direct coal gasification: a steady-state model," Ind. Eng. Chem. Res. (1989) 28:1414-1424.

Examination from Indian Patent Application No. 4273/CHEN/2006, Jun. 30, 2011, 2 pages.

* cited by examiner

LIQUID ANODE ELECTROCHEMICAL CELL

CROSS-REFERENCE TO RELATED APPLICATIONS

This application claims priority under 35 U.S.C. §119(e)(1) to Provisional U.S. Patent Application Ser. No. 60/572,900, filed May 19, 2004. The disclosure of this provisional application is incorporated by reference in its entirety.

TECHNICAL FIELD

This invention relates generally to electrochemical cells, and specifically to electrochemical cells capable of operation as fuel cells, using directly fuels other than hydrogen.

BACKGROUND

A typical device for direct (one-step) conversion of chemical energy into electricity utilizes fuel and oxidizer as reagents. Both reagents may be in gas, liquid, or solid (including paste) forms.

Batteries are electrochemical devices that irreversibly consume the reagents while supplying current to an external circuit. Rechargeable batteries are devices that reversibly consume the reagents, such that the initial reagents may be restored by supplying a current to the device from an external source. The major limitation of all batteries is their limited capacity, usually expressed in Ampere-hours. Rechargeable batteries have a limited number of charge-discharge cycles and thus eventually fail.

The fuel cell is another type of electrochemical device for generating electricity. Fuel cells are characterized by having open anode and cathode reaction chambers. Fuels cells operate when fuel is supplied into the anode chamber and oxidizer is supplied into the cathode chamber. Fuel cells do not have such disadvantages as limited capacity and a limited number of charge-discharge cycles. The efficiency of the electrochemical fuel cell increases with temperature for the practical temperature ranges. Typical fuel cells may have electric outputs ranging from under 1 kW up to megawatts.

Schematically, a fuel cell may be described as a multi-layer system: fuel/current collector/anode/electrolyte/cathode/current collector/oxidizer. A typical solid oxide fuel cell operating on hydrogen may be described as hydrogen/nickel cermet/yttria stabilized zirconia/lanthanum strontium manganite/air. Current collectors are embedded in the anode and cathode.

A major disadvantage of conventional fuel cell design is that the electrode reactions proceed using an inefficient three-phase boundary. To elaborate, the fuel cell electron flow is generated by an electrochemical reaction of fuel oxidation with release of electrons. Conventional oxidation reactions proceed at a three-phase boundary: electrode-electrolyte-gaseous reactant. The actual working surface of the electrodes in this case is very small and does not exceed 1-4% of the apparent electrode surface. Accordingly, more than 95% of the electrode area does not participate in the electricity generation process. Multiple attempts have been made to increase the useful area of the electrodes by introducing mixed (electronic and ionic) conductors into the three-phase boundary. When this is done, working area may increase up to 5-10%. Still, at best, about 90% of the electrode area is not being used.

Fuel cell developers devote major attention to cells operating on gaseous fuel (hydrogen, natural gas, CO). Cells operating on a solid fuel, such as carbon-containing materials (coal, biomass, or waste—both municipal and from the petrochemical industry) have received much less attention. At the same time, operation on solid fuel may have such advantages as: much safer operation (fuel is not flammable or explosive), easier transportation, generally low cost, high power density, and, in some cases such as when carbon-containing fuel is used, much higher efficiency of energy conversion. The last is a result of the near-zero entropy loss in complete electrochemical oxidation of carbon. This translates to efficiency above 70%, while the efficiency of gas-fueled cells is in the 30-50% range.

Use of carbon-containing fuel for electricity generation in electrochemical fuel cells (Direct Carbon Fuel Cell or DCFC) opens an opportunity to eliminate release of fuel oxidation products and contaminants into atmosphere, which is the major problem associated with coal combustion power plants.

For general background on fuel cells, please refer to James Larminie & Andrew Dicks, *Fuel Cell Systems Explained* (Wiley 2d ed. 2003), and to EG&G Services et al., *Fuel Cell Handbook* (U.S. Department of Energy, 5th ed. 2000).

A variety of schemes have been proposed for a direct carbon fuel cell. None have as yet come to commercial fruition. For example, U.S. Pat. No. 5,298,340 to Cocks and LaViers stated that "[t]hermodynamic factors favor a solid carbon fuel cell over other fuel cell designs." They proposed "the dissolution of carbon into a solvent" which would "act[ ] as an anode." In their subsequent U.S. Pat. No. 5,348,812, Cocks and LaViers taught that "[f]uel cells containing an anode of molten metal into which carbon has been dissolved, and a carbon-ion electrolyte, can be improved by making the molten metal the same as that used as the cation on the solid carbon-ion-electrolyte."

U.S. Pat. No. 6,607,853 to Hemmes discusses fuel cells based on the oxidation of carbon and carbon-containing materials contained in a molten corrosive salt. The possibility of internal reformation is included, but not explicitly required. In Hemmes' disclosure the molten corrosive salt contacts both the solid electrolyte and the anode. Hemmes discloses that the anode may be porous, made of nickel, and in contact with the solid electrolyte. Hemmes also discloses that the anode may be positioned at a distance from the solid electrolyte.

U.S. Pat. No. 6,692,861 to Tao addresses a fuel cell with a carbon-containing anode and an electrolyte having a melting temperature of between about 300° C. and about 2000° C. in contact with the anode. U.S. Pat. No. 6,200,697 to P. Pesavento of SARA, Inc., Cypress, Calif., describes a concept for generating electricity using a carbon-containing consumable anode. Because that concept employs a consumable anode, it is in essence a large nonrechargeable battery. Subsequently, J. Cooper of Lawrence Livermore National Laboratory has sought to develop a fuel cell employing carbon nanopowder as fuel using molten carbonate electrolyte, similar to the concept developed by Robert D. Weaver at SRI International in the 1970s.

There is thus a need in the art for a direct carbon fuel cell which can be scaled up effectively to a commercially viable size, at a minimum to the hundreds of kilowatts of present-day commercial phosphoric acid cogeneration fuel cell plants or molten carbonate fuel cells, and which can operate efficiently with naturally available fuels such as coal, coke, tar, biomass, and various forms of carbon-containing wastes.

SUMMARY OF THE INVENTION

The patent describes fuel cells for converting fuel chemical energy into electricity. The concept is based on the replacement of the traditional three phase reaction boundary (electrode-gas-electrolyte) with a two-phase boundary concept: liquid electrode(s) mixed with fuel or oxidizer separated by a solid electrolyte.

A preferred embodiment of the invention includes a fuel cell which comprises an electronic conductor serving as an anode current collector, a liquid anode, a fuel distributed in the liquid anode, a solid oxygen ion-conductive electrolyte, a gas diffusion cathode, an inlet for gaseous oxidizer, and an outlet for gas evolved during the operation of the fuel cell.

A further preferred embodiment of the invention interconnects a number of fuel cells in order to obtain higher voltage and power. An electrical load, for example an DC/AC inverter, having two terminals is connected with one terminal connected to the anode current collector of the first fuel cell and the other terminal connected to the cathode current collector of the last fuel cell. Fuel cells may also be connected in parallel or in series and in parallel.

A further preferred embodiment of the invention is a method for supplying an electric current to a load. Fuel is mixed with a conductive liquid anode. The fuel may be, for example, a carbon-containing material (coal, coke, biomass, tar, or various waste forms) or a metal (for example aluminum) in a powder form. The electronically conductive mixture of the liquid anode with fuel contacts a solid oxygen ion-conductive electrolyte. The fuel is oxidized by oxygen ions entering the liquid anode from the electrolyte, releasing electrons. An oxidizer is supplied to a cathode connected to the opposite side of solid electrolyte, causing an oxygen reduction reaction to occur to produce a flux of oxygen ions through the electrolyte. The liquid anode is electrically connected to a terminal of the load via an electronically conductive current collector. With this method executed in a preferred manner as discussed below, the current supplied will be sufficient to transfer to the load at least 100 mW for each square centimeter of cell working surface area.

DETAILED DESCRIPTION OF EMBODIMENTS OF THE INVENTION

Before describing the present invention in detail, it is to be understood that this invention is not limited to specific fuels, materials, or device structures, as such may vary. It is also to be understood that the terminology used herein is for the purpose of describing particular embodiments only, and is not intended to be limiting.

It must be noted that, as used in this specification and the appended claims, the singular forms "a," "an," and "the" include both singular and plural referents unless the context clearly dictates otherwise. Thus, for example, reference to "an outlet" includes a plurality of outlets as well as a single outlet, reference to "an inlet" includes a plurality of inlets as well as single inlet, and the like.

The present invention introduces electrochemical devices for electrochemical energy conversion, which are believed to have two-phase reaction zones. A two-phase reaction zone for oxidation reactions is established by using a liquid anode. A two-phase reaction zone for reduction reactions is established by using a liquid cathode.

One embodiment of the present invention teaches a liquid electrode fuel cell having a solid electrolyte with a gas diffusion cathode on one side, and a liquid anode on the other side. The liquid anode is electronically conductive media, based, for example, on molten salts mixed with electronically conductive fuel particles. The liquid anode also plays the role of the fuel carrier. The liquid anode may be stagnant or it may recirculate through the fuel cell constantly supplying fuel and removing fuel oxidation products and fuel impurities. Electronic conductivity of the liquid electrode makes the current collection scheme much more efficient because the liquid electrode acts as if it were a part of a distributed current collector.

In fuel cells of the invention with a liquid anode, the anode will tend to conduct electrons reasonably well. Thus, the electrochemical reaction will take place at the boundary between the liquid anode mixed with fuel and an oxygen ion conducting electrolyte (a two-dimensional "two-phase boundary"). In the case of an ionically conductive liquid anode, that reaction zone may be expanded to the bulk of the liquid anode (a three-dimensional reaction zone). If the fuel is a finely dispersed solid within the liquid anode, the electrochemical reaction can take place at a large surface area. As a result, the liquid anode fuel cell will have higher power density and will be able to generate more electricity while having smaller geometrical dimensions. A liquid electrode fuel cell will scale up to hundreds of kW or even tens of MW of electric output more easily than conventional fuel cells with a three-phase reaction boundary, such as Solid Oxide Fuel Cells (SOFC).

Similar advantages in terms of reaction area may be obtained for the reduction of oxygen if the cathode is an ionic liquid.

There are other technical, manufacturing, and operating advantages besides a large reaction area to having one or both of the electrode(s) in an electrochemical system be liquid. From a heat transfer perspective, a liquid anode carrying solid fuel will tend to have much higher heat capacity than gaseous fuel, reducing heat differentials and allowing efficient transfer of heat generated in the electrochemical system. Liquids do not raise the same concerns with thermal expansion mismatch that solid electrodes do, and so there may be longevity advantages to the use of liquid electrodes. Recirculation of the liquid anode provides a means to achieve close to complete utilization of the fuel. It is also simpler with liquid anode fuel cells to provide an exit path for the gases evolved and reduce accumulation of impurities. In contrast, in gas-fueled cells, fuel oxidation gases will dilute the incoming fuel stream so that portions of the fuel cell which are downstream in the anode gas flow may be comparatively poorly supplied with fuel, adversely affecting efficiency.

A fuel oxidation reaction which has a high reaction surface area in a liquid anode can run without catalyst. This is an important positive attribute for liquid anodes because commonly available fuels such as coal and biomass may contain impurities that would poison a catalyst.

Sealing requirements to separate fuel and oxidizer are not so stringent as in the case of gas fueled cells, which helps achieve low cost, reliability, and scalability.

The fuel cells of the invention may be operated with static or flow-through modes of operation.

In a static mode of operation, the liquid electrolyte (or liquid/solid composite electrolyte/electron-conductor/fuel) undergoes no net motion during cell operation. Stirring may be used, however, to facilitate particle-particle and/or particle-electrode contact, enhance diffusional mass transport, or to dislodge trapped gas bubbles. Furthermore, the liquid anode may be periodically drained to remove suspended and dissolved impurities, and replaced with fresh liquid.

In a flowing mode of operation, liquid anodes and/or cathodes are caused to flow during cell operation. The flow may be gravitationally induced from an upper reservoir to a lower. Alternatively the fluid can be pumped in a continuously recirculating flow down, along, or up through the cell. The purpose of the flow may be to enhance diffusional mass transport, to dislodge trapped gas bubbles or to remove suspended and dissolved impurities in continuous recirculation.

The electrochemical devices of the invention may be, for example, of tubular, planar, or monolith configurations.

Figure 1:
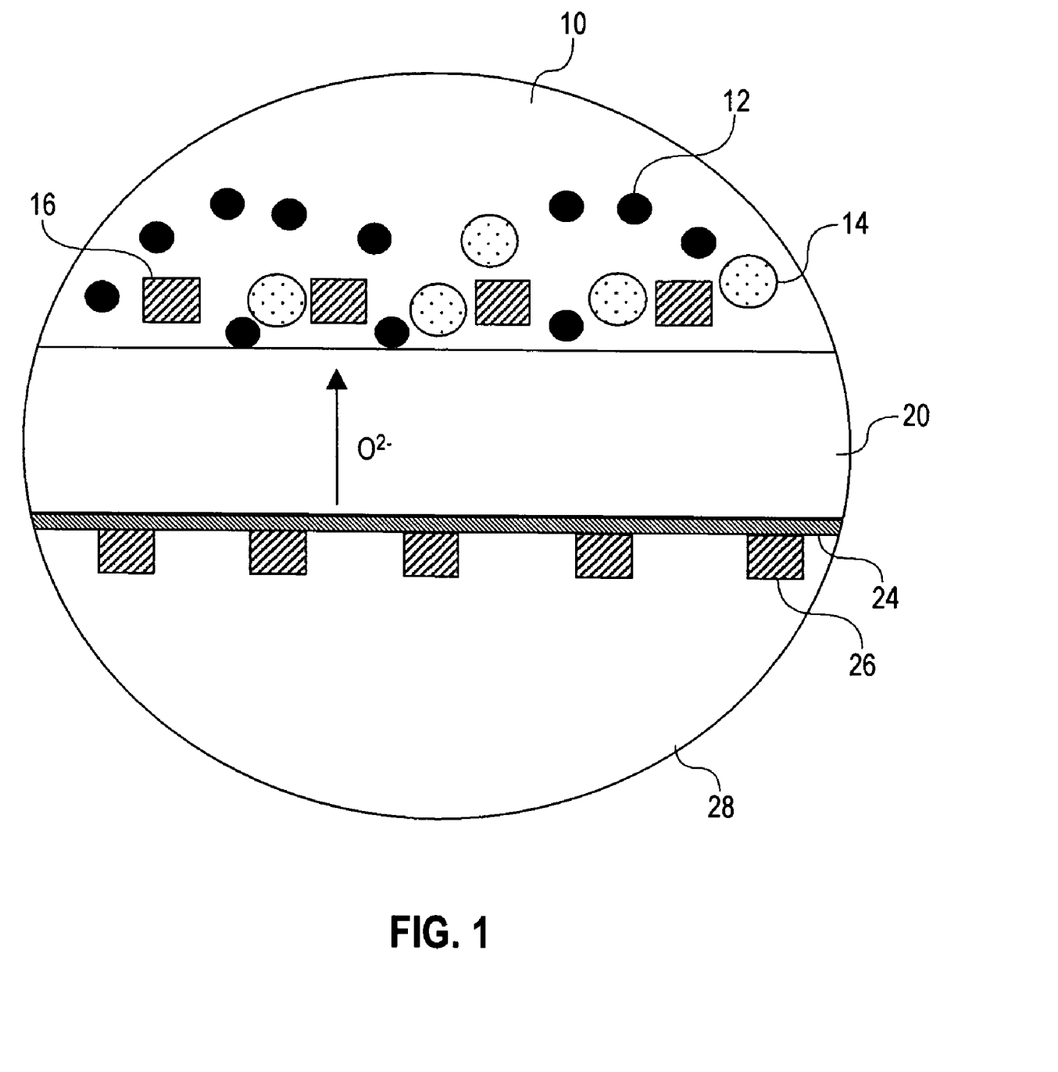
FIG. 1 is a general schematic diagram of a liquid anode electrochemical cell.

FIG. 1 depicts in schematic form an exemplary configuration of the liquid anode concept of the invention. The liquid anode 10 contains fuel particles depicted as black circles 12. The liquid anode also contains gases evolved by the anode reaction, depicted as bubbles 14. Immersed within the liquid anode is an anode current collector 16. $O^{2-}$ ions pass through electrolyte 20 entering the liquid anode 10. On the other side of electrolyte 20, there is a cathode 24. It is in contact with a cathode current collector 26. Passing over the cathode is gaseous oxidizer 28, which is reduced at the cathode creating the $O^{2-}$ ions.

A preferred embodiment of the invention includes a fuel cell which comprises an electronic conductor serving as an anode current collector, a liquid anode, a fuel distributed in the liquid anode, a solid oxygen ion-conductive electrolyte, a gas diffusion cathode, an electronic conductor serving as a cathode current collector, an inlet for gaseous oxidizer, a second inlet for replenishing or recirculating the liquid anode, an outlet for used gaseous oxidizer, with an optional second outlet for recirculating fuel and gas evolved during the operation of the fuel cell.

In the normal operation of such a fuel cell, the two terminals of an electrical load are connected to the anode current collector and the cathode current collector. Preferably, a number of such fuel cells would be interconnected, with one terminal of the electrical load connected to the anode current collector of the first cell and the other terminal connected to the cathode current collector of the last cell. The electrical load will typically include a DC/AC converter.

The anode current collector may be any suitable metal or other electronic conductor compatible with the conditions of use. Preferably the anode current collector is in the form of a mesh or a spiral. Alternatively, the anode current collector may have a solid shape defining channels in which the liquid anode exists. The channels may serve to channel the liquid anode when it recirculates.

The liquid anode is any liquid which is electronically conductive when mixed with fuel particles and compatible with conditions such as operating temperatures. Preferably the liquid anode is a composition of molten salts and molten oxides. Examples of suitable salts include eutectic mixtures of $K_2CO_3$, $Li_2CO_3$, and/or $Na_2CO_3$.

It is preferred that the liquid anode containing fuel be recirculated using natural circulation or a pump. Such recirculation has, for example, the benefit that it achieves a more uniform distribution of the fuel within the liquid anode.

Suitable solid fuels, for example, are those containing carbon, which undergoes the reaction $C+2O^{2-} \rightarrow CO_2+4e^-$ given a suitable supply of $O^{2-}$ and a suitable sink for electrons $e^-$ or metals, such as aluminum.

Usable fuels containing carbon can be, for example, coal, coke, tar, biomass, and plastic waste. Preferably the fuel comprises solid particles.

The concentration of fuel in the liquid anode will vary over time as the fuel cell is operated and fuel is consumed and replenished. The choice of fuel concentration can influence the efficiency of the fuel cell. As it was observed experimentally, anode ohmic losses can be reduced significantly by a higher concentration of fuel.

The electrolyte may be selected from a group of solid oxide oxygen ion conductive materials, stable in the expected operating conditions, and can be fabricated in the form of thin layers on a supporting substrate. Among suitable electrolytes are yttria-stabilized zirconia (YSZ) and lanthanum gallate with doping of the lanthanum sublattice with strontium from about 0% to about 30% and of the gallium sublattice with lithium oxide from about 0% to about 30%. Additives, such as alumina, may be included in modest quantities to stabilize the electrolyte further.

In a preferred embodiment, the electrolyte may be a thin film electrolyte with thickness of, for example, 1-50 microns deposited on a supporting cathode. Alternatively, it may be a self-supporting solid electrolyte with thickness, for example, up to 0.3-0.8 mm.

The cathode may be any suitable gas permeable mixed conductive material with the coefficient of thermal expansion (CTR) compatible with the CTR of the electrolyte. The cathode may be of the type referred to as "gas diffusion" cathodes. A preferred cathode is strontium doped lanthanum manganite.

In an alternative embodiment of the invention, the cathode may be an ionic liquid carrying oxidizer.

The cathode current collector is an electronically conductive material such as metal or alloy stable under given oxidizing conditions. The cathode current collector preferably contacts the cathode at a number of points. When the cathode current collector is metallic, a mesh or a spiral are preferred shapes of the cathode current collector.

A preferred oxidizer is air.

The fuel cell is enclosed in a vessel of a suitable material adapted to the conditions of operation. A number of geometric arrangements of the fuel cell are possible. The common arrangement for fuel cells is as a large number of planar or tubular fuel elements which are connected together into a "stack."

The temperatures employed in fuel cells of the invention, in order to cause the anode and cathode reactions to proceed a desirable rate, mean that the gases leaving the fuel cells (for example $CO_2$ where the anode reaction is $C+2O^{2-} \rightarrow CO_2+4e^-$) will contain considerable usable thermal energy. The operation of the fuel cell will evolve heat, for example through ohmic loss, which will be transmitted to the gases as well as to the liquid anode. In such an arrangement preferably the heat of the exiting gases would be made use of in some way. It could be conveyed to other fluids, for example incoming oxidizer, water needing to be heated, or fluid to be used for heating a structure, by means of a heat exchange mechanism. The use of the heat of the exiting gases or, in some cases, the heat of the circulating liquid anode, would permit the fuel cells of the invention to be used in a combined heating and power plant, in the manner that existing phosphoric acid, molten carbonate electrolyte, and solid oxide fuel cells are employed.

There is considerable concern with $CO_2$ emissions into the atmosphere based on the belief that they give rise to a greenhouse effect which warms the earth. The $CO_2$ produced where the anode reaction is $C+2O^{2-} \rightarrow CO_2+4e^-$ is therefore readily confined and may be sequestered in some manner or utilized further, for example in the cathode gas stream of a conventional hydrogen fuelled molten carbonate electrolyte fuel cell. The relative purity of the $CO_2$ produced when the anode reaction is $C+2O^{2-} \rightarrow CO_2+4e^-$ facilitates its sequestration.

In the fuel cells of the invention it is possible to provide fuel in a continuous or batch fashion to the liquid anode. In some cases it may be possible to replenish the fuel periodically in a batch fashion through an inlet giving access to the liquid anode. It may also be desirable, when naturally occurring fuels such as biomass are used, to remove from the liquid anode unreacted residue of the fuel. Furthermore, gases generated by the anode reaction and fuel impurities may evolve or dissolve in the liquid anode material and have to be removed to prevent contamination of the liquid anode. For these purposes, it is preferred that the circulation of the liquid anode material be such that some fraction of that material is at a location where it can conveniently be accessed for purposes of replenishment or, if desired, removal of fuel residue and/or dissolved gases.

In a particularly preferred embodiment of the invention, the fuel is a ground solid, for example carbon, coal, wood, or aluminum. The anode is a liquid, for example a eutectic mixture of suitable molten salts. The anode current collector is a metal member immersed in the liquid anode and adjacent to the surface of solid electrolyte. The electrolyte is an $O^{2-}$ conducting solid, for example yttria-stabilized zirconia. The cathode is a suitable porous mixed conductor, for example lanthanum strontium manganite. The cathode current collector is a metal member contacting the cathode at a considerable number of points. The operating temperature is between 600° C. and 1000° C.

Figure 2:
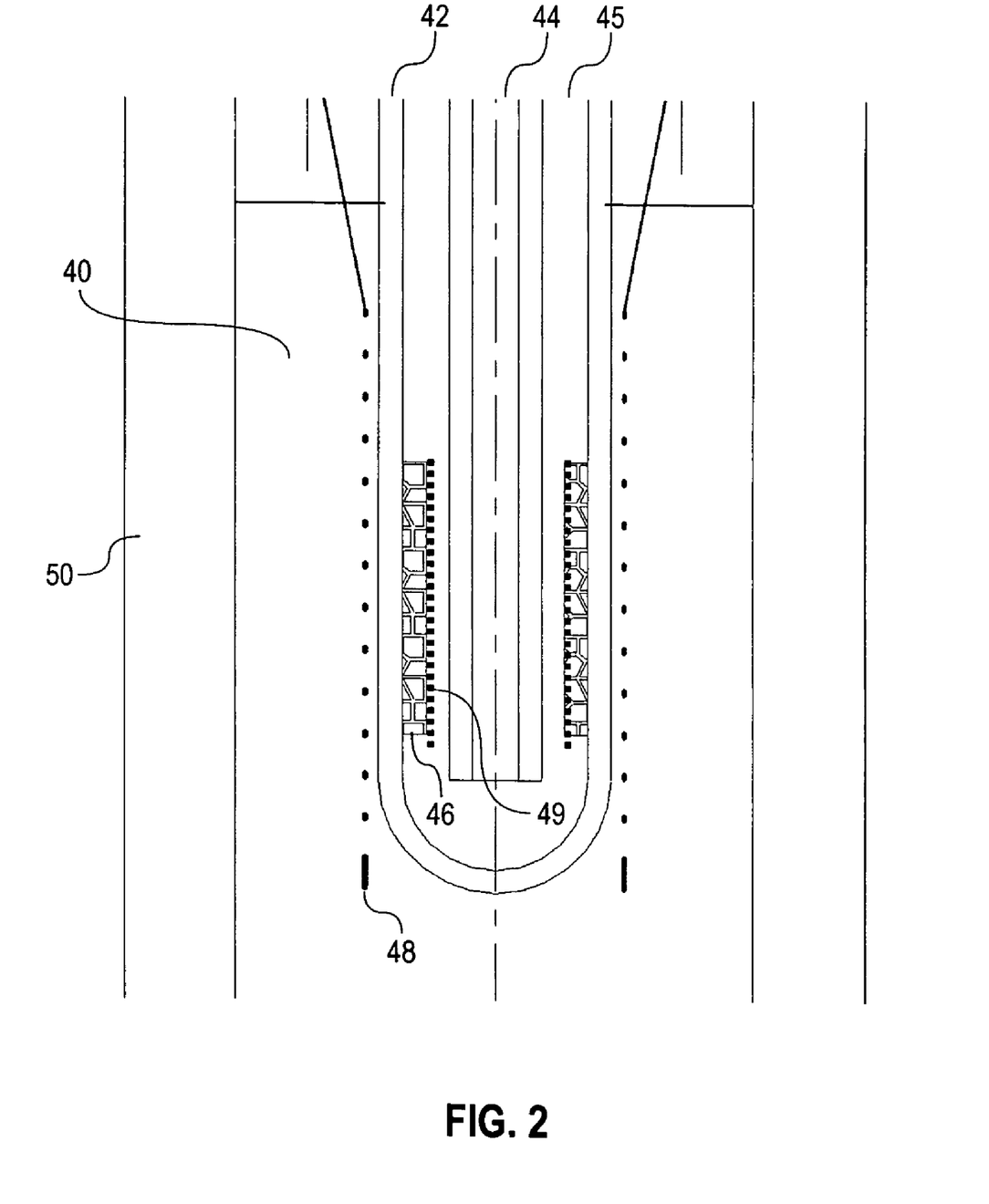
FIG. 2 is a schematic design for a liquid anode electrochemical cell.

FIG. 2 depicts a configuration of this preferred embodiment used to study experimentally the performance of the liquid anode fuel cell. As may be seen, a tubular arrangement was adopted, with the platinum anode current collector 48 and liquid anode 40, which comprises a molten mixture of $Li_2CO_3+K_2CO_3+Na_2CO_3$, enclosed by a containing tube 50. The solid YSZ electrolyte closed end tube with wall thickness 0.3-0.8 mm 42 is immersed into the anode, and the LSM cathode 46 is deposited as a 1 mm layer on the inner surface of the solid electrolyte tube. The cathode current collector 49 lies inward of the cathode itself. The tube containing the fuel cell is closed on both ends. Air is supplied through the inner portion of the tube 45 and exhausted through a concentric tube 44. A version of FIG. 2 has been constructed with a YSZ tube diameter 10 mm, the height of the cathode 10 mm, and employing a containing tube inner diameter of 27 mm.

Figure 3:
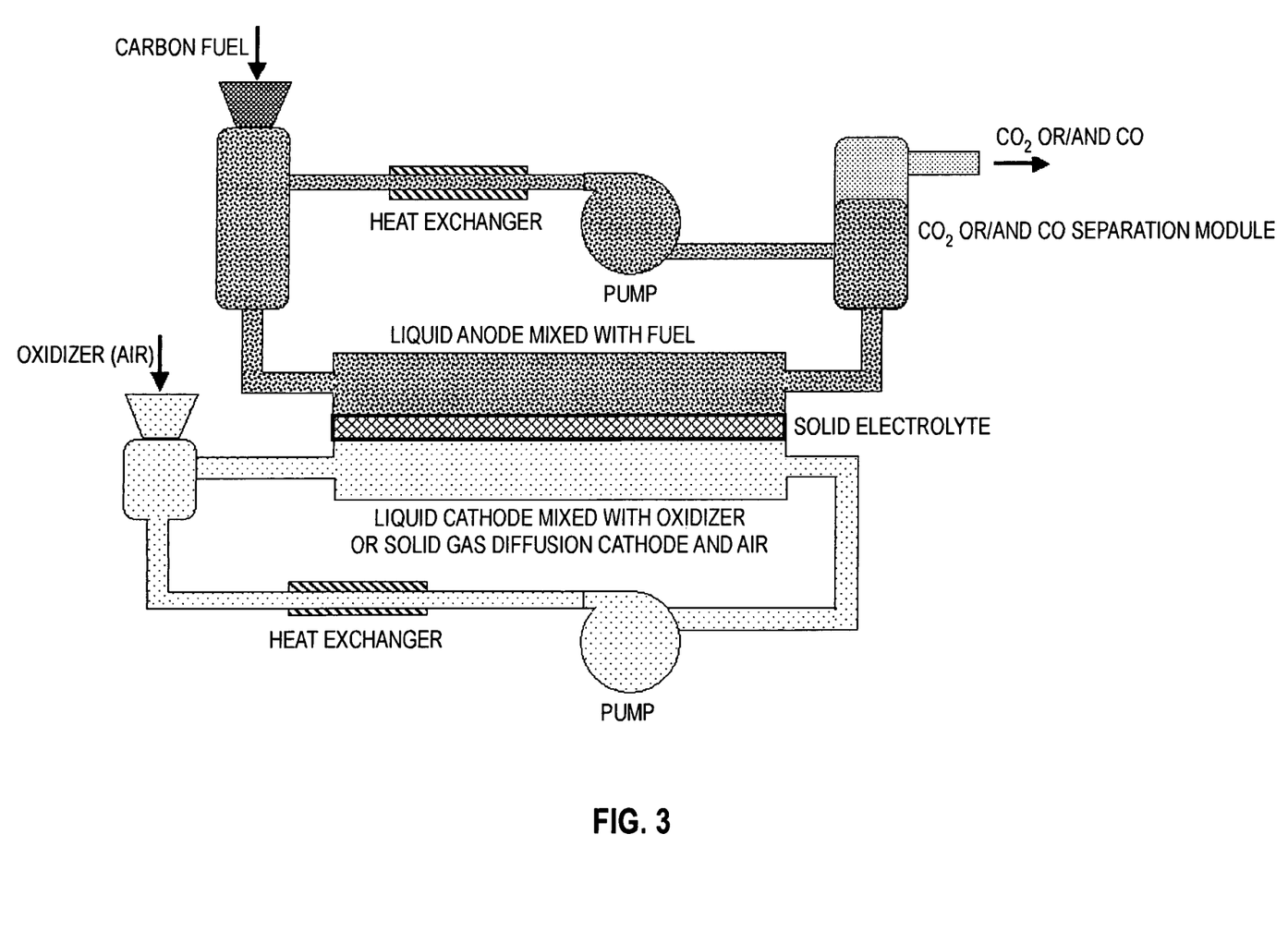
FIG. 3 illustrates a continuous operation liquid anode fuel cell in a further embodiment of the present invention.

FIG. 3 illustrates a continuous operation fuel cell 500 in a further embodiment of the present invention. The fuel cell 500 includes liquid electrodes 502 and 504 equipped with current collectors (not shown) separated by a solid ion conductive electrolyte 506, a fuel dispensing module 508, oxidizer supplying module 510, a module for separation of the reaction products 512, an anode circulation module 514 (e.g., a pump), a cathode circulation module 516, and two heat exchangers 518 and 520.

Figure 4:
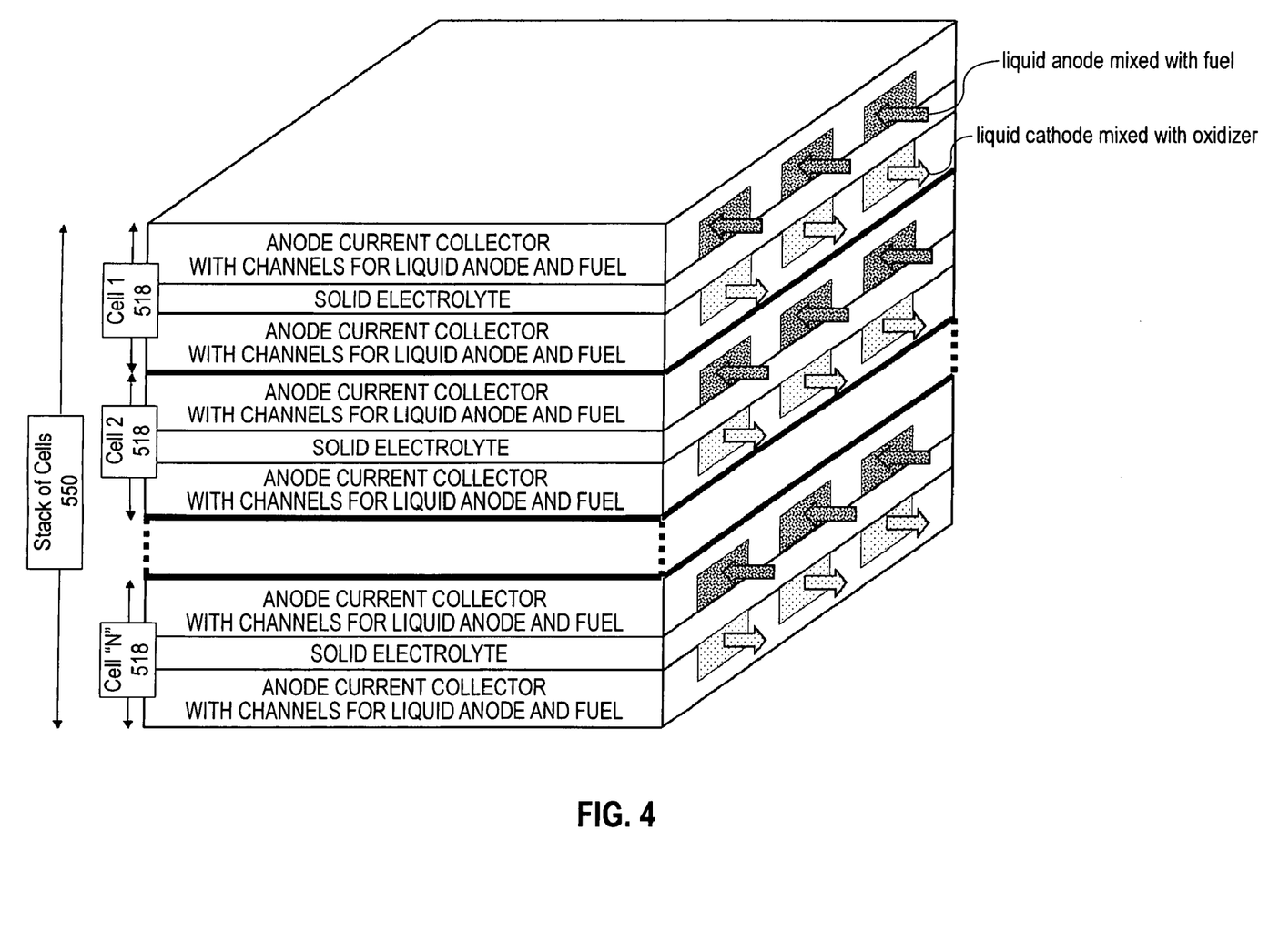
FIG. 4 illustrates a fuel cell stack assembly formed of a number of fuel cells having liquid anode and cathode.

FIG. 4 illustrates a fuel cell stack assembly 550 having a plurality of liquid electrode planar fuel cells 552 according to a different embodiment of the present invention. It is seen that both anode and cathode are liquid in this embodiment, and that the respective anode and cathode current collectors form channels for the flow of the liquids. The liquid electrodes are circulated by means of one or more electrically insulated pumps (not shown) in order to establish a uniform distribution of fuel and oxidizer over the reaction zone.

Figure 5:
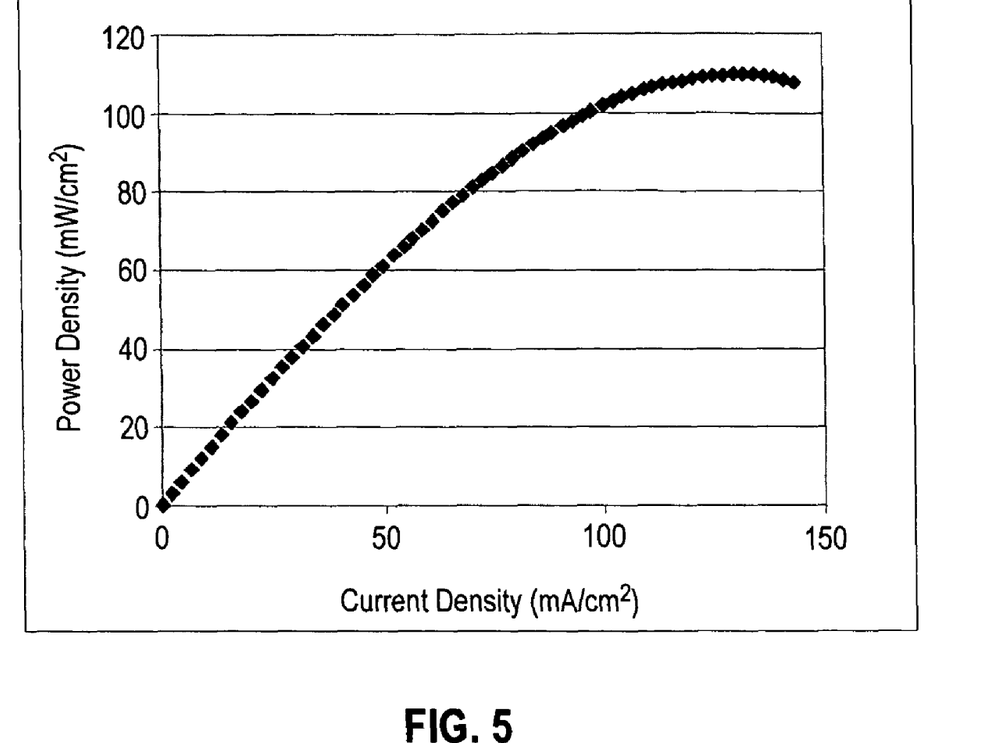
FIG. 5 shows cell power density as a function of current density for an electrochemical cell of the invention.

FIG. 5 depicts power density as a function of current density for the fuel cell shown in FIG. 2 at 950° C. with PRB coal as fuel. Volumetric fuel content in the liquid anode was about 40%. An electromotive force of about 1.4 V was observed in this experiment. A maximal power density above 100 mW/cm² was observed. This level of power density achieved with real fuel suggests that the inventive fuel cell has considerable commercial potential, as one may conclude from comparison with commercially available molten carbonate fuel cells, which have power outputs above 100 kW and power densities close to 100 mW/cm². (As is normal in describing fuel cell operation, power density was obtained in FIG. 5 dividing power by cell working surface area. For the configuration of FIG. 2, this working surface area is the area of a cylinder with diameter equal to the outer diameter of the YSZ tube. The height of the cylinder is the minimal height among the cathode, cathode current collector, and anode current collector.)

Figure 6:
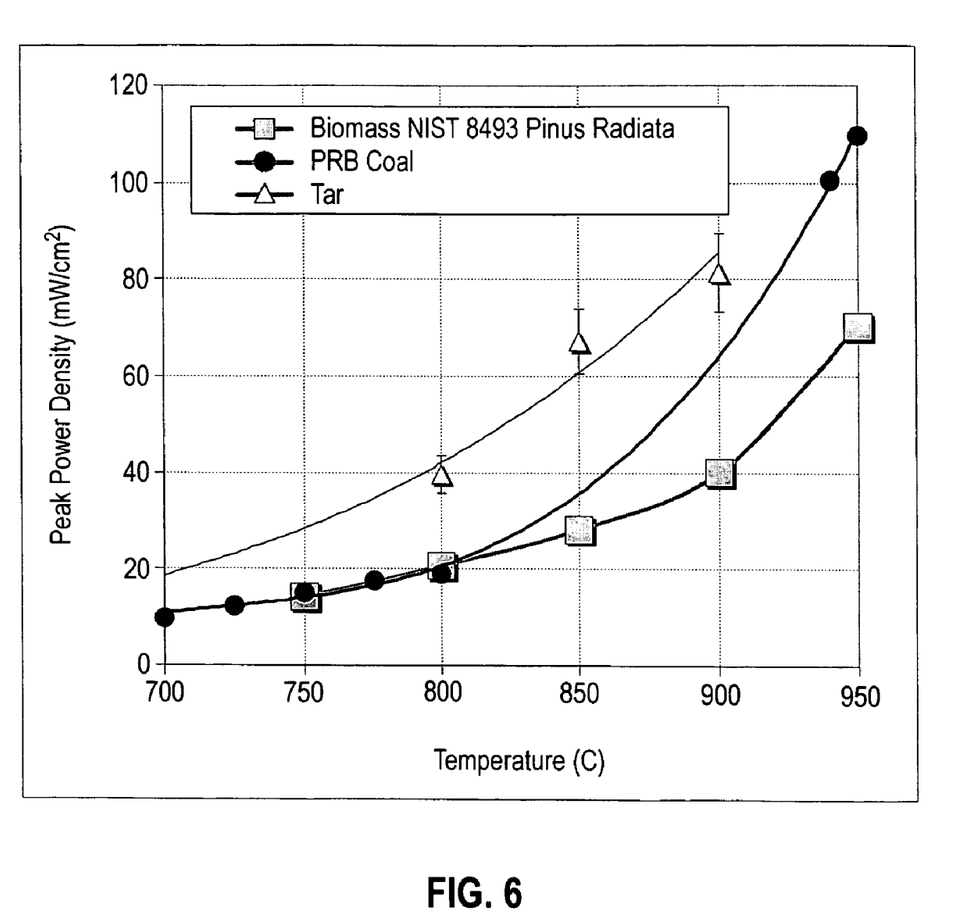
FIG. 6 shows cell power density as a function of temperature for an electrochemical cell of the invention operating with coal, biomass, and tar.

FIG. 6 depicts the peak power density as a function of operating temperature observed at similar conditions for coal and other real fuels—biomass (pine saw dust) and tar (Maya atmospheric tower bottom) with the preferred fuel cell shown in FIG. 2 and described above.

It is contemplated that fuel cells of the invention will be interconnected and assembled in a stack. Sufficient number of stacks will be interconnected to achieve desired power output from a standalone unit. The modular principle and the resulting scalability are an attractive feature of the invention. For example, this plant could produce hundreds of kilowatts as a distributed power generation unit or be scaled up to tens of megawatts for centralized power generation.

It is to be understood that while the invention has been described in conjunction with the preferred specific embodiments thereof, that the foregoing description and the examples that follow are intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

We claim:
1. A fuel cell comprising
   (a) a conductor serving as an anode current collector,
   (b) a liquid anode, wherein the liquid anode comprises molten carbonate salts, molten oxides, or mixtures thereof,
   (c) fuel distributed in the liquid anode, wherein a power density of at least 50 mW/cm² is obtained using acetylene black as the fuel,
   (d) a solid oxygen ion-conductive electrolyte,
   (e) a cathode,
   (f) a first inlet for gaseous oxidizer,
   (g) an outlet for gas evolved during the operation of the fuel cell.
2. The fuel cell of claim 1, further comprising an anode recirculation system for recirculating the liquid anode.

3. The fuel cell of claim 1, further comprising a fuel replenishment system for replenishing the supply of fuel in the liquid anode.

4. The fuel cell of claim 1, further comprising a liquid anode cleanup system for removing from the liquid anode fuel oxidation products and impurities accumulated during cell operation.

5. The fuel cell of claim 1, wherein the anode current collector forms a channel for the passage of the liquid anode.

6. The fuel cell of claim 1, wherein the fuel is solid.

7. The fuel cell of claim 6, wherein the fuel is in the form of solid particles.

8. The fuel cell of claim 1, wherein the fuel is a liquid or molten hydrocarbon.

9. The fuel cell of claim 1, further comprising a system for confining some or all of the gases evolved during the operation of the fuel cell so as to avoid their dispersal into the atmosphere.

10. The fuel cell of claim 1, comprising a liquid anode outlet which is connected to a heat exchanger for utilizing the heat in liquid anode and gaseous fuel oxidation products leaving the fuel cell.

11. The fuel cell of claim 1, further comprising a second outlet for used oxidizer gases, wherein the second outlet is connected to a heat exchanger for utilizing the heat in the used oxidizer gases leaving the fuel cell.

12. The fuel cell of claim 1, wherein the liquid anode comprises alkali salts.

13. The fuel cell of claim 1, wherein the liquid anode mixed with fuel is electronically conductive.

14. The fuel cell of claim 1, wherein the liquid anode is oxygen ion conductive.

15. The fuel cell of claim 1, wherein the solid electrolyte is oxygen ion conductive.

16. The fuel cell of claim 1, wherein the cathode comprises a porous layer adjacent to the electrolyte.

17. The fuel cell of claim 1, wherein the cathode comprises at least one of: a solid gas-diffusion cathode or a liquid mixed with an oxidizer.

18. The fuel cell of claim 17, wherein the liquid comprises an ionic liquid.

19. The fuel cell of claim 1, wherein the electrolyte is of approximately tubular form.

20. The fuel cell of claim 19, wherein the cathode is of approximately tubular form concentric with the electrolyte.

21. The fuel cell of claim 1, wherein the electrolyte is of approximately planar form.

22. The fuel cell of claim 1, wherein the cell has a monolith configuration with channels for fuel and oxidizer.

23. A fuel cell assembly comprising two or more fuel cells according to claim 1 electrically interconnected.

* * * * *